US010727582B1

(12) United States Patent
Crouch et al.

(10) Patent No.: US 10,727,582 B1
(45) Date of Patent: Jul. 28, 2020

(54) PRINTED BROADBAND ABSORBER

(71) Applicant: RAYTHEON COMPANY, Waltham, MA (US)

(72) Inventors: David D. Crouch, Los Angeles, CA (US); Larry C. Martin, Eastvale, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/422,020

(22) Filed: May 24, 2019

(51) Int. Cl.
*H04W 40/00* (2009.01)
*H01Q 1/52* (2006.01)

(52) U.S. Cl.
CPC .................................. *H01Q 1/525* (2013.01)

(58) Field of Classification Search
CPC ...... H04B 1/04; H04B 1/48; H04B 10/25752; H04B 17/12; H01Q 1/52; H01Q 1/521; H01Q 1/525; H01Q 3/26; H01Q 9/20; H04W 40/00
See application file for complete search history.

(56) References Cited

U.S. PATENT DOCUMENTS

| | | | | |
|---|---|---|---|---|
| 5,552,455 | A | 9/1996 | Schuler et al. | |
| 9,059,508 | B2 | 6/2015 | Worl et al. | |
| 9,190,723 | B1 * | 11/2015 | Hong | H01Q 1/52 |
| 9,961,812 | B2 | 5/2018 | Suorsa | |
| 2003/0190931 | A1 * | 10/2003 | Fry | H04B 1/48 455/561 |
| 2011/0199972 | A1 * | 8/2011 | Warke | H01Q 3/26 370/328 |
| 2014/0255040 | A1 * | 9/2014 | Fujita | H01Q 17/00 398/130 |
| 2018/0166791 | A1 | 6/2018 | Kim et al. | |
| 2018/0175512 | A1 | 6/2018 | Isom | |

* cited by examiner

*Primary Examiner* — Thanh C Le
(74) *Attorney, Agent, or Firm* — Cantor Colburn LLP

(57) ABSTRACT

A radio frequency (RF) system includes a transmitter and a receiver. The transmitter includes a transmitter (TX) antenna array and a TX signal absorber. The TX antenna array is configured to output a first RF signal. The receiver includes a receiver (RX) antenna array and a RX signal absorber. The RX antenna array is configured to receive a second RF signal. The TX signal absorber and the RX signal absorber are each configured to absorb energy induced by the RF signal thereby mitigating electrical co-site interference between the transmitter and the receiver.

17 Claims, 9 Drawing Sheets

PRINTED BROADBAND ABSORBER

BACKGROUND

The present disclosure relates to radio frequency systems and, in particular, to a system and method to mitigate radio frequency co-site interference between co-located radio frequency systems.

Co-site interference on airborne and sea-based platforms which employ multiple radio frequency (RF) functions like electronic warfare, radar and communications may have an adverse performance effect on the on-board RF systems. For example, in a communications system, a transmitting antenna on one part of the exterior of a military or commercial vehicle may generate strong signals that may be received by a receiver located in close-proximity (i.e., at a co-site with respect to the transmitter), even if the main beam of the antenna is aimed well away from the receiving antenna on another part of the exterior of the vehicle.

SUMMARY

According to a non-limiting embodiment of the present disclosure, a radio frequency (RF) system includes a transmitter and a receiver. The transmitter includes a transmitter (TX) antenna array and a TX signal absorber. The TX antenna array is configured to output a first RF signal. The receiver includes a receiver (RX) antenna array and a RX signal absorber. The RX antenna array is configured to receive a second RF signal. The TX signal absorber and the RX signal absorber are each configured to absorb energy induced by the first RF signal thereby mitigating electrical co-site interference between the transmitter and the receiver.

According to another non-limiting embodiment of the present disclosure, a printed broadband absorber (PBA) comprises a plurality of broadband dual-polarized array cells. Each array cell includes a plurality of conductive elements. A ground plane is in signal communication with the plurality of broadband dual-polarized array cells. The ground plane is electrically coupled to a ground potential. An electrically conductive signal layer is configured to establish a matched terminated impedance of the plurality of broadband dual-polarized array cells that mitigates co-site electrical interference between a transmitter and a receiver.

According to yet another non-limiting embodiment, a method of reducing co-site electrical interference comprises surrounding a transmitter (TX) antenna array included in a transmitter with a TX signal absorber, and outputting a first RF signal via the TX antenna array. The method further comprises surrounding a receiver (RX) antenna array included in a receiver with a RX signal absorber. The RX antenna array is configured to receive a second RF signal, which may be different from the first RF signal. The TX signal absorber and the RX signal absorber are each configured to absorb energy induced by the first RF signal thereby reducing the co-site electrical interference between the transmitter and the receiver.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Various non-limiting embodiments described herein provide a radio frequency (RF) signal absorber configured to mitigate or suppress co-site interference. The RF signal absorber can be configured as a printed broadband absorber (PBA) that includes a plurality of broadband dual-polarized array cells. Each array cell includes a plurality of paired orthogonally polarized conductive elements such as, for example, dipoles. The broadband dual-polarized array cells are electrically coupled to a ground plane via a matched termination (e.g., a 50Ω resistor). Accordingly, a matched terminated impedance is established such that PBA absorbs energy induced by an RF signal with minimal reflection thereby mitigating co-site electrical interference between the transmitter and the receiver.

Figure 1A:
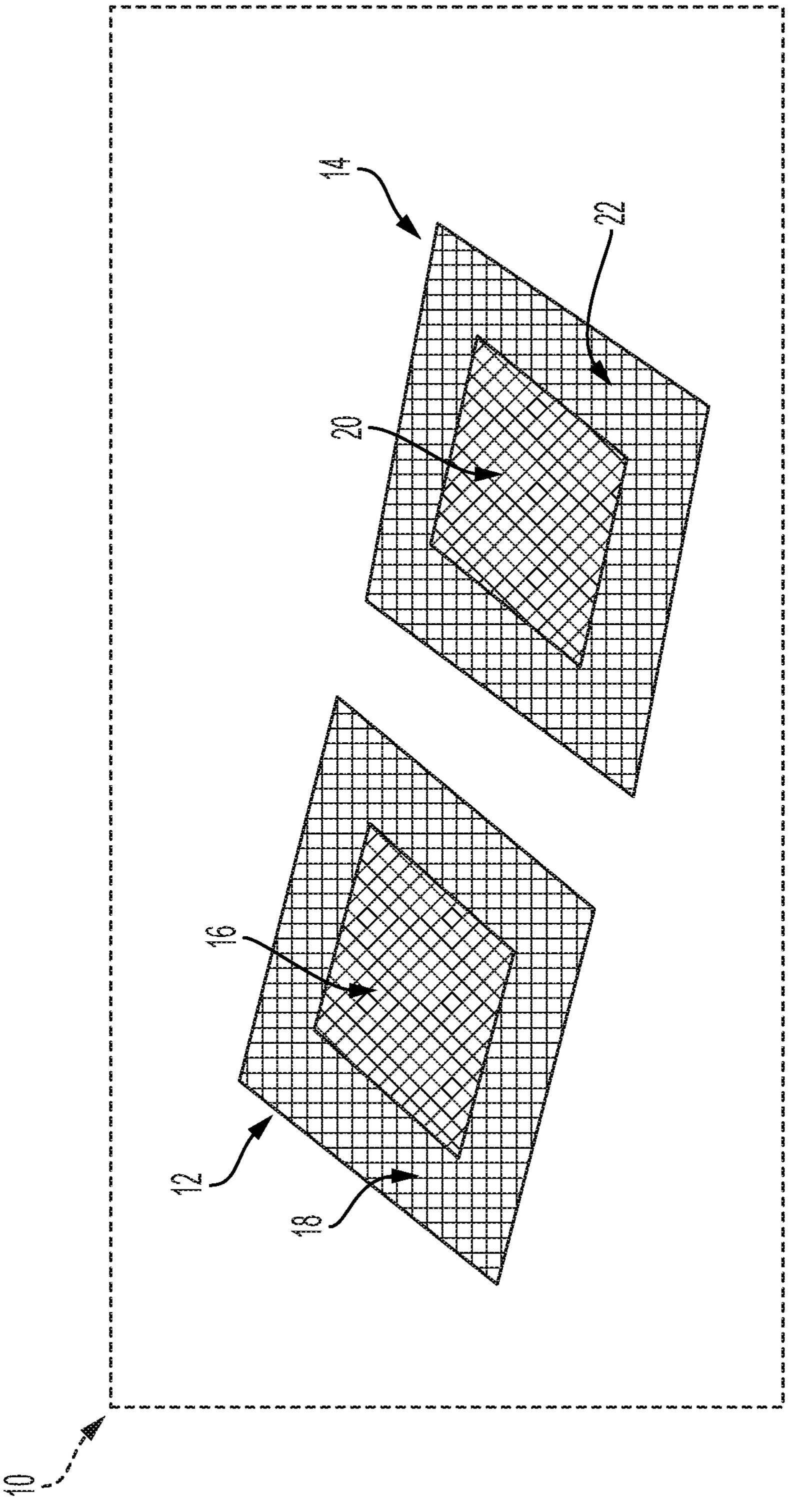
FIG. 1A illustrates a radio frequency transceiver according to a non-limiting embodiment of the invention.
Figure 1B:
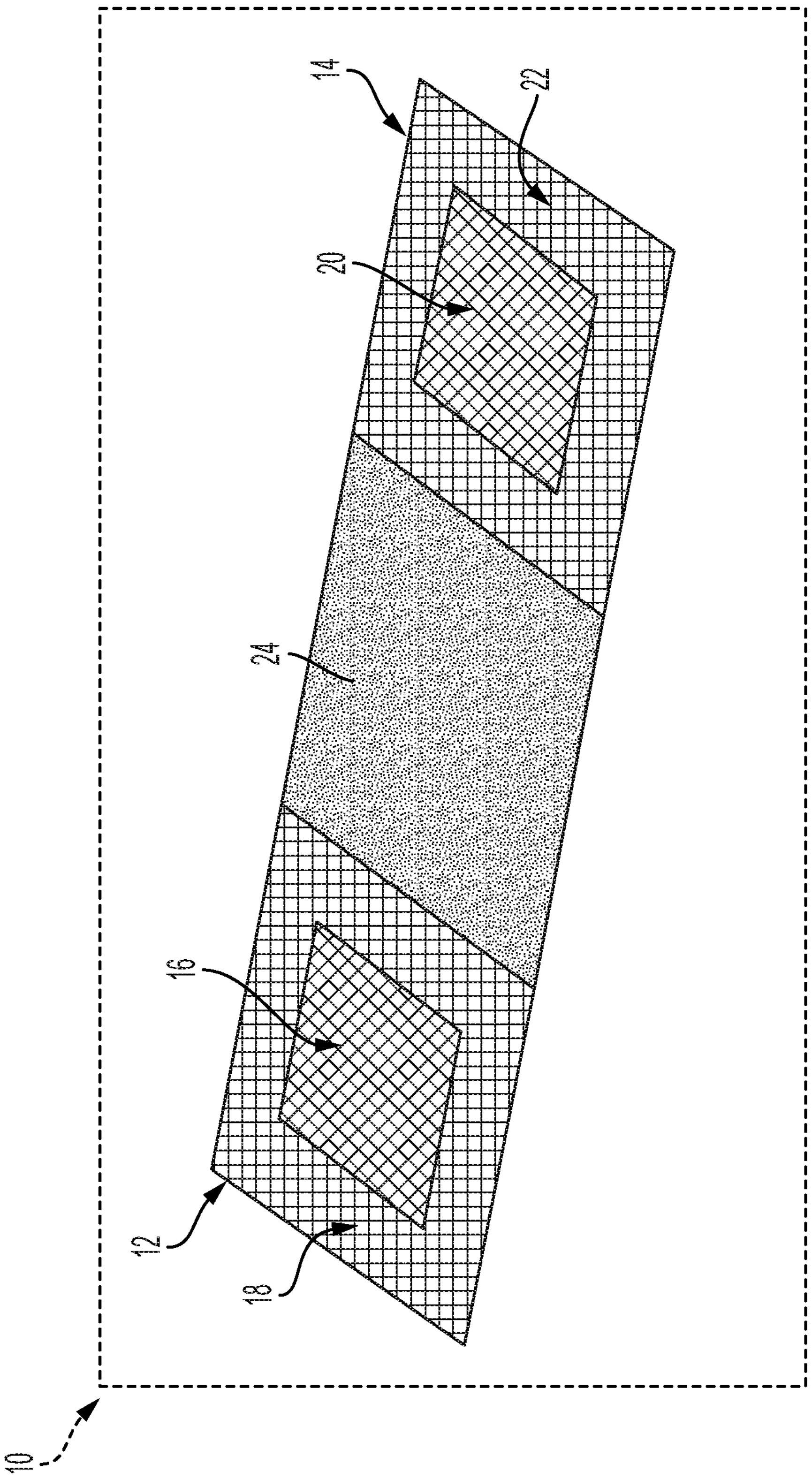
FIG. 1B illustrate a radio frequency transceiver according to another non-limiting embodiment of the invention.

Turning now to FIGS. 1A and 1B, a radio frequency (RF) system 10 is illustrated according to a non-limiting embodiment of the invention. The RF system 10 is configured to operate over a wideband spectrum such as the S-band through the X-band, or 2.5 GHz to 12.5 GHz. The RF system 10 includes a first transceiver 12 and a second transceiver 14, which are installed in close proximity with one another on a common platform, i.e., a co-site. In one or more embodiments a distance ranging, for example, from about 0.5 meters to about 50 meters separates the first transceiver 12 from the second transceiver 14. In some embodiments, the first transceiver 12 and second transceiver 14 are included in a single RF system. In other embodiments, the first transceiver 12 and/or the second transceiver 14 are independent transceivers implementing separate functions. For example, the first transceiver 12 can be implemented in a radar system, while the second transceiver 14 can be implemented in a communication system located remotely away (i.e., a distance away) from the first transceiver 12, e.g., the radar system.

In some embodiments, an RF system 10 can include a first transceiver 12 and second transceiver 14. For example, a first transceiver 12 for a radar system can include a first antenna operating as a transmitter/receiver for a radar system 12, while a second transceiver 14 located a distance away from the first transceiver 12 can include a second antenna operating as a transmitter/receiver for a communication system 14.

The first transceiver 12 includes a first antenna array 16 and a first signal absorber 18. The first antenna array 16 is configured to send/receive a first RF signal. The second transceiver 14 includes a second antenna array 20 and a second signal absorber 22. The second antenna array 20 is configured to send/receive a second RF signal.

The first signal absorber 18 and the second signal absorber 22 are each configured to absorb energy thereby mitigating electrical interference between the first transceiver 12 and the second transceiver 14. Accordingly, energy associated with the RF system 10 is effectively attenuated between the first antenna array 16 and the second antenna array 20, i.e., electrical signal isolation between the first antenna array 16 and the second antenna array 20 is increased.

In at least one non-limiting embodiment, the RF system 10 includes a radio-absorbing material (RAM) isolation barrier 24. The RAM isolation barrier 24 is interposed between the first transceiver 12 and the second transceiver 14, and is configured to further reduce transmitter-to-receiver coupling. In one or more embodiments, the RAM isolation barrier 24 can attenuate the transmission of electromagnetic radiation from the first antenna array 16 to the second antenna array 20 by about 20 dB over a frequency range extending from about 4 GHz to about 18 GHz.

The RAM isolation barrier 24 can be formed from various dielectric or high-k materials. In some embodiments, the RAM isolation barrier 24 is composed of a rubberized foam material impregnated with a controlled mixture of carbon particles and iron particles. The thickness of the RAM isolation barrier 24 may be selected to be sufficiently great to have a significant effect on electromagnetic waves propagating across its surface or through it at high frequencies (e.g., greater than about 4 GHz). In some embodiments, a 0.055 inch thick layer of radar absorbing material is used; in some embodiments the RAM isolation barrier 24 includes a material referred to as "UI-80". The material referred to by those of skill in the art as UI-80 is 80% by weight iron loaded urethane resin, the "U" of the name "UI-80" identifies the binder as being urethane and the "I" identifies the material as being iron-based. UI-80 is a magnetic radar absorbing material (MagRAM).

UI-80 consists of two components; (1) carbonyl iron powder (CIP), which acts as the absorber, and (2) urethane, which is the binder. UI-80 is mixed to include 80% CIP and 20% urethane by weight. In other embodiments, these components are combined in other ratios. In some embodiments the radar absorbing material layer is composed instead of UI-70 or UI-60. Other binders, such as silicone may be used instead of urethane; SI-80 is a material with this composition. In some embodiments, a radar absorbing material that is carbon based rather than iron based is used. Such a material may be referred to as a material of the SL series (e.g., SL-24, or SL); it may lack the magnetic component but may be lighter weight.

Other types of MagRAMs include silicone resin based SI-80 and epoxy based EI-80, etc. MagRAM sheets are thin, flexible absorbers. The thickness of a MagRAM sheet used to form the radar absorbing material layer may be limited by weight requirements (e.g., to thicknesses less than 0.060").

Figure 2:
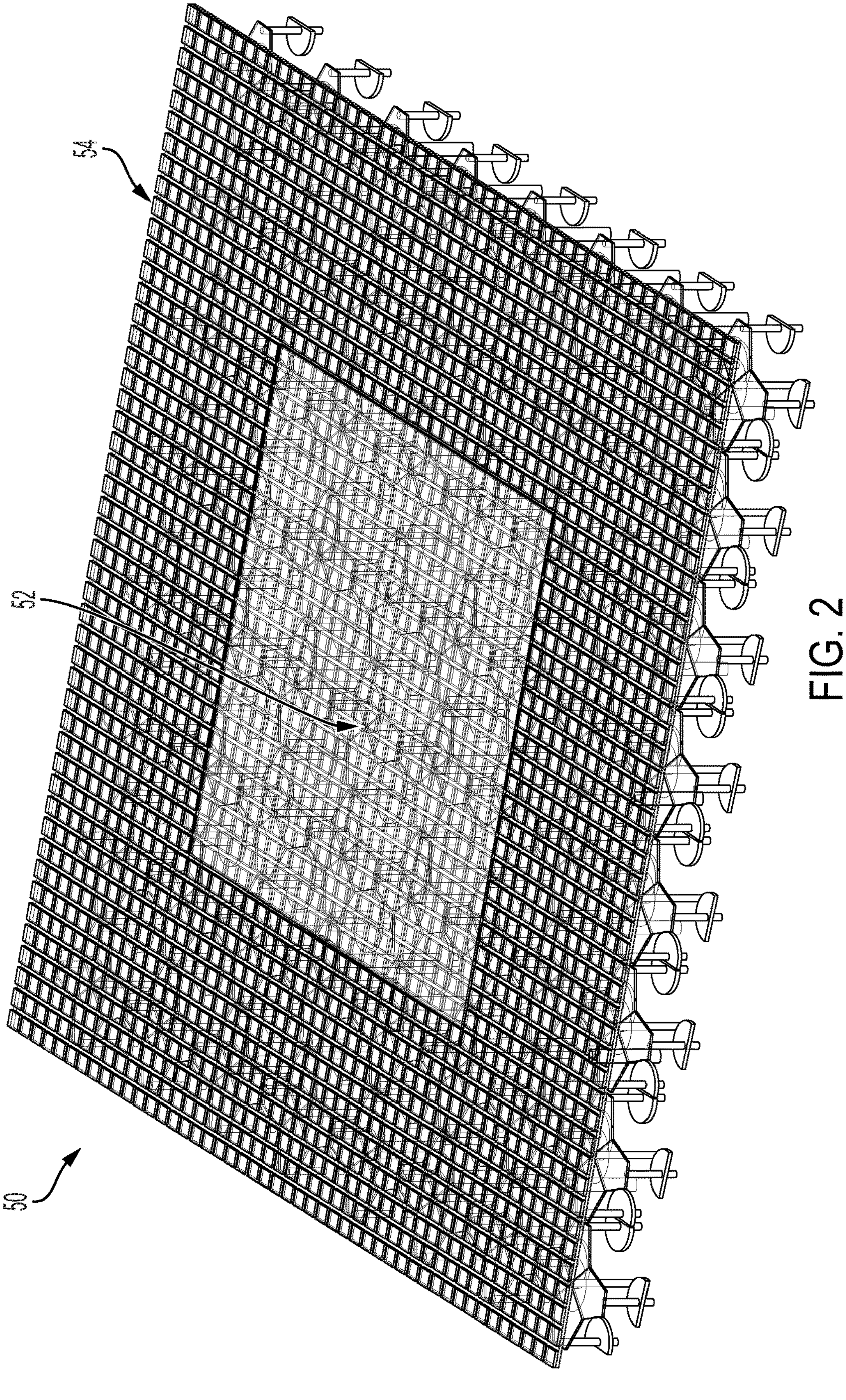
FIG. 2 illustrates a radio frequency system including an antenna array surrounded by a printed broadband absorber according to a non-limiting embodiment.

Turning now to FIG. 2, an RF device 50 is illustrated according to a non-limiting embodiment. The RF device 50 can operate as a transmitter and/or a receiver. The RF device 50 includes a first array 52 of broadband dual-polarized conductive elements and a second array 54 of broadband dual-polarized conductive elements. The first array 52 of broadband dual polarized conductive elements is configured to output an RF signal and/or receive an RF signal. The second array 54 of broadband dual-polarized conductive elements is configured as an RF signal absorber. The second array 54 of broadband dual-polarized conductive elements provides wideband attenuation to facilitate simultaneous operation by neighboring multi-function RF systems (e.g., transceiver 10) having shared or overlapping frequency bands.

In at least one embodiment, the second array 54 of broadband dual-polarized conductive elements can be constructed as a printed broadband absorber (PBA). Accordingly, the PBA can be positioned co-planar with respect to the first array 52 of broadband dual-polarized conductive elements, and can completely surround the first array 52 as further illustrated in FIG. 2.

Figure 3:
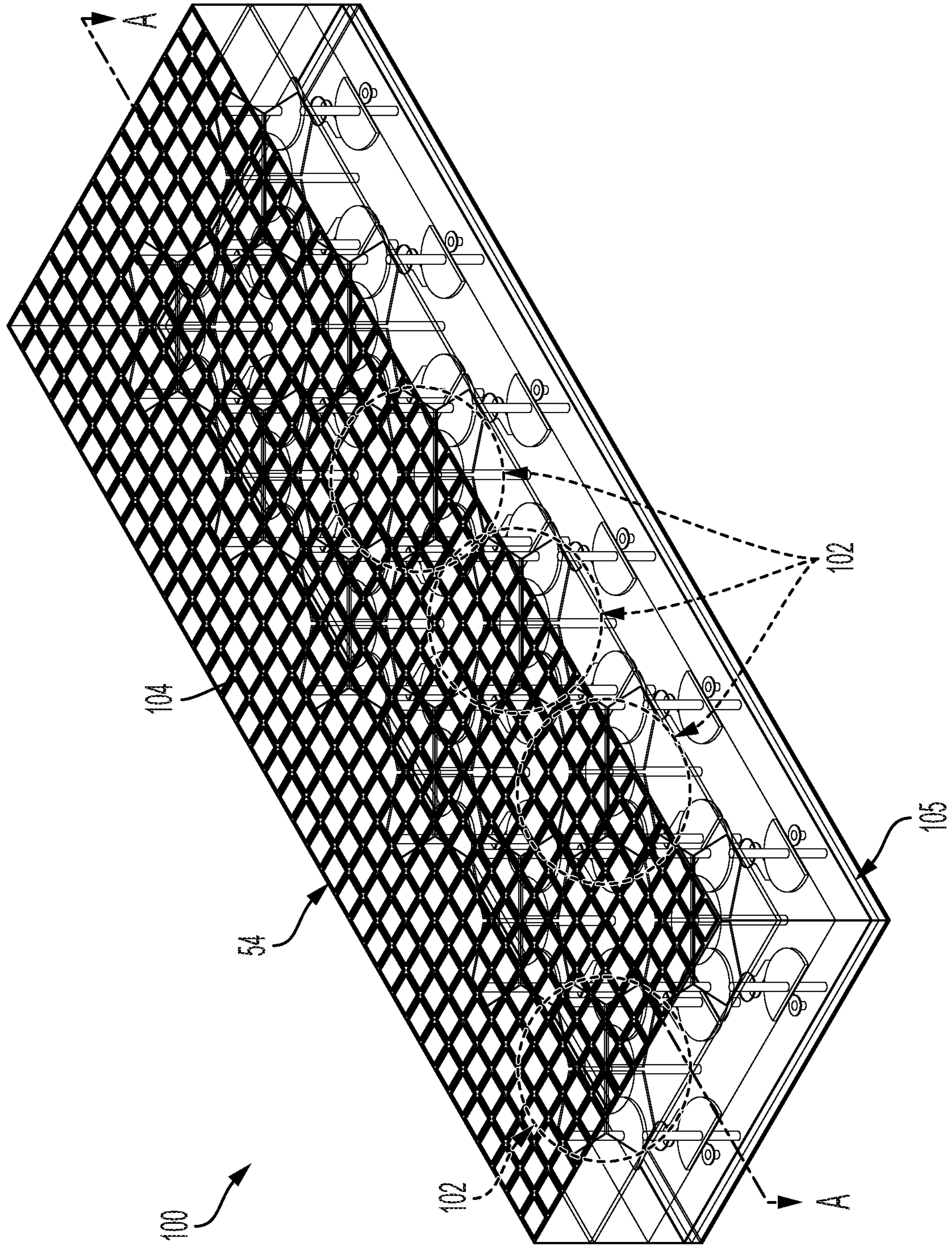
FIG. 3 illustrates a printed broadband absorber according to a non-limiting embodiment.
Figure 4:
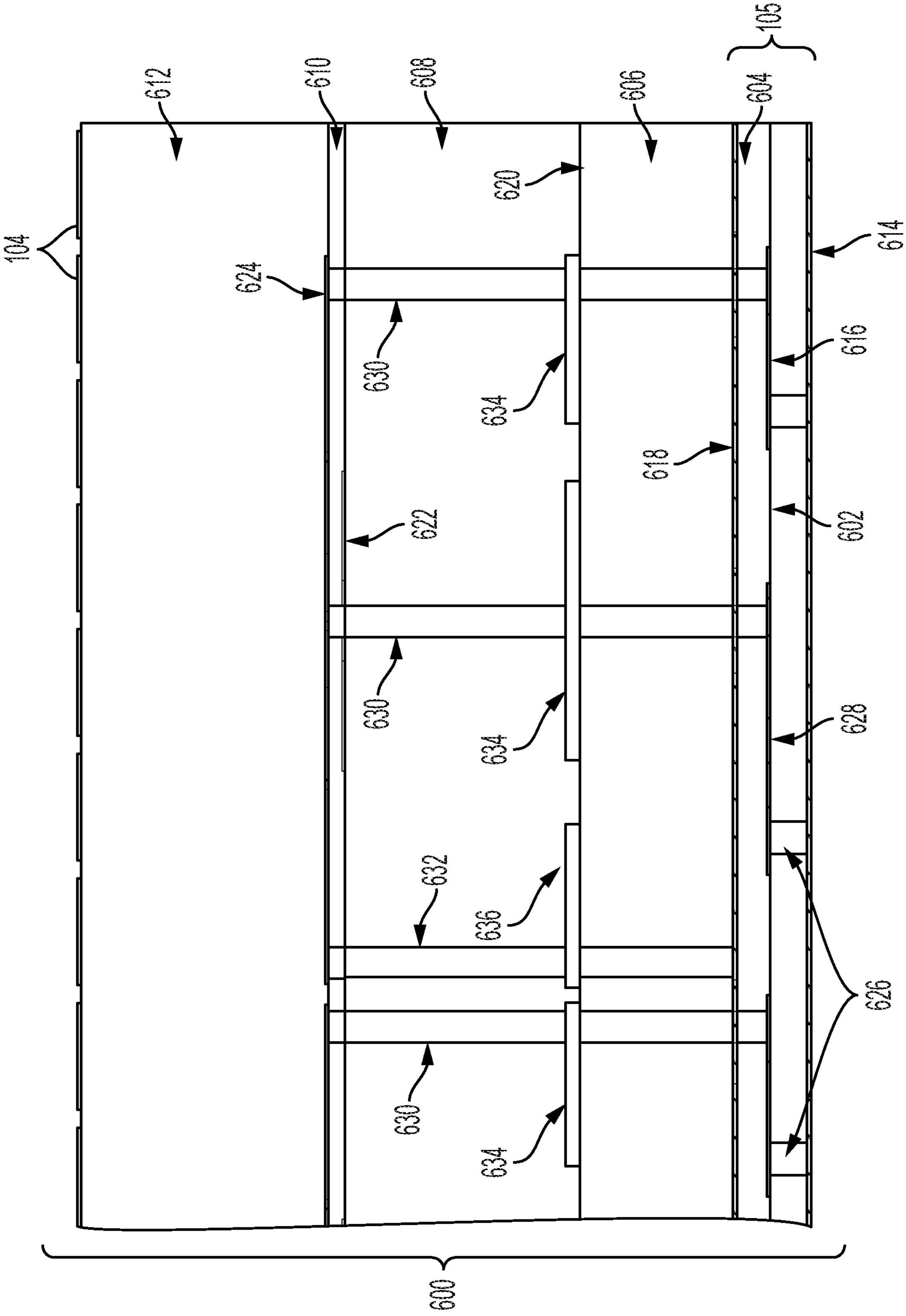
FIG. 4 is a cross-sectional view of the printed broadband absorber taken along line A-A according to a non-limiting embodiment.
Figure 5:
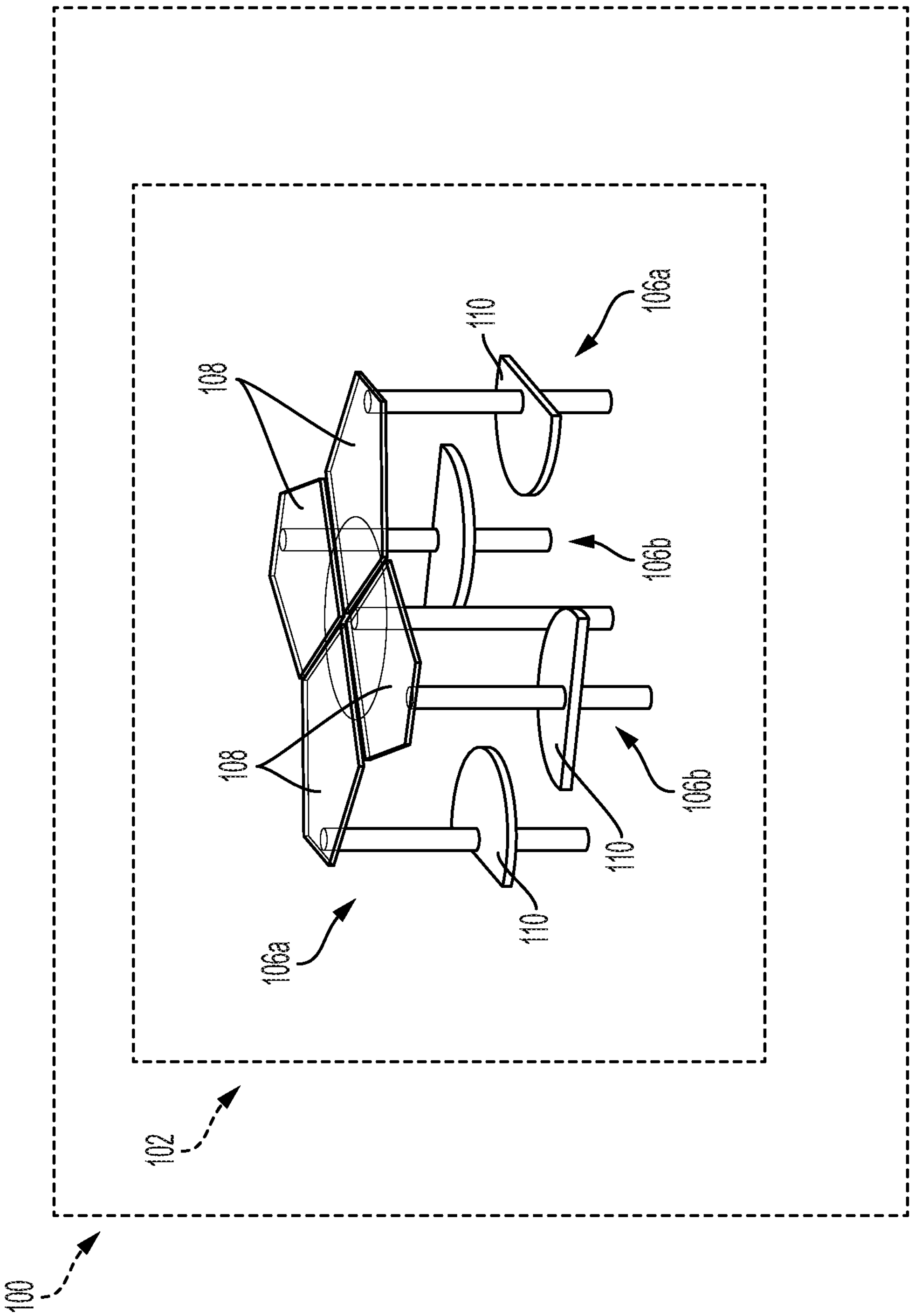
FIG. 5 illustrate is an isolated view of a broadband dual-polarized array cell included in the printed broadband absorber according to a non-limiting embodiment.
Figure 6B:
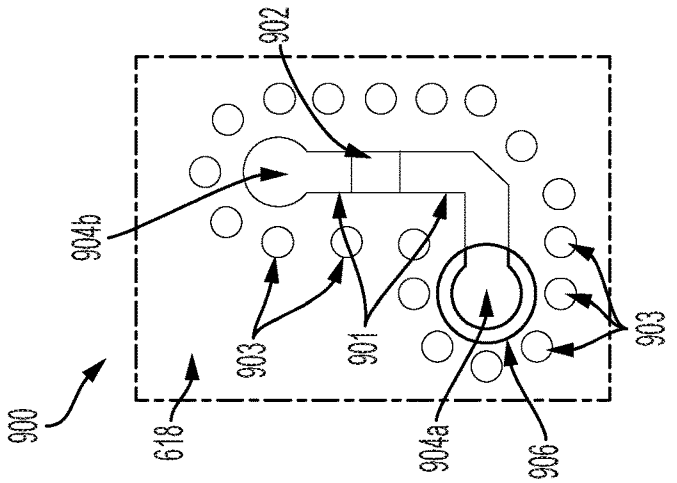
FIG. 6B illustrates a stripline element included in the PWB stripline termination network shown in FIG. 6A.
Figure 6A:
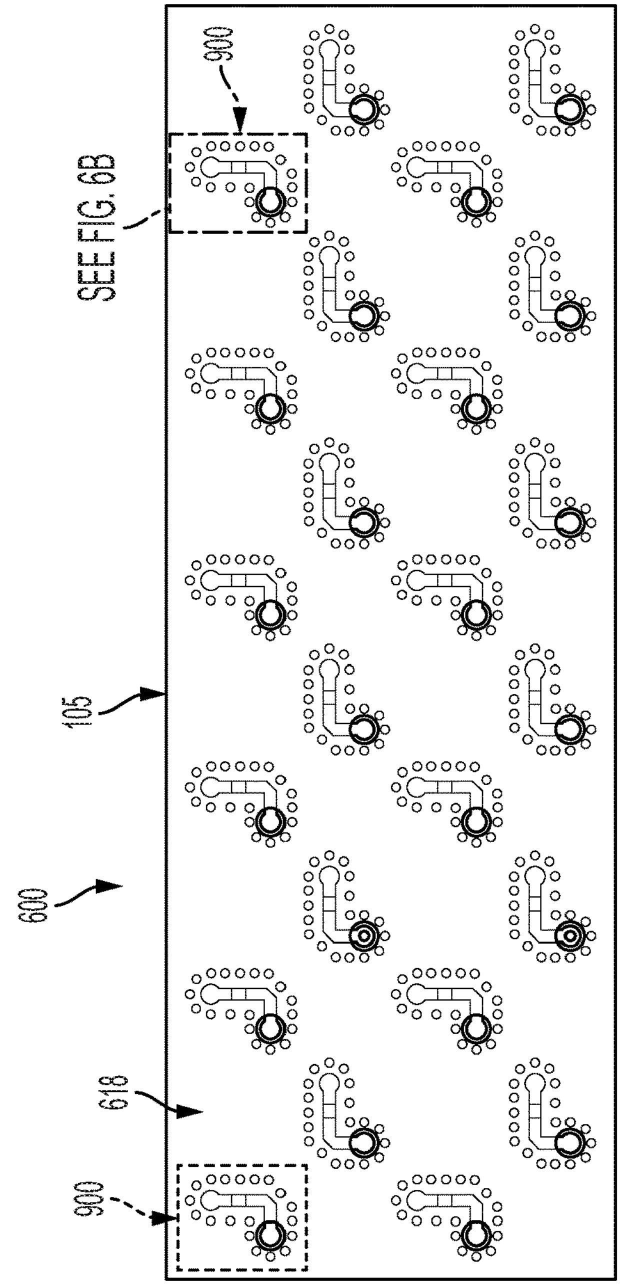
FIG. 6A is top view of a PWB stripline termination network included in a printed broadband absorber according to a non-limiting embodiment.
Figure 7:
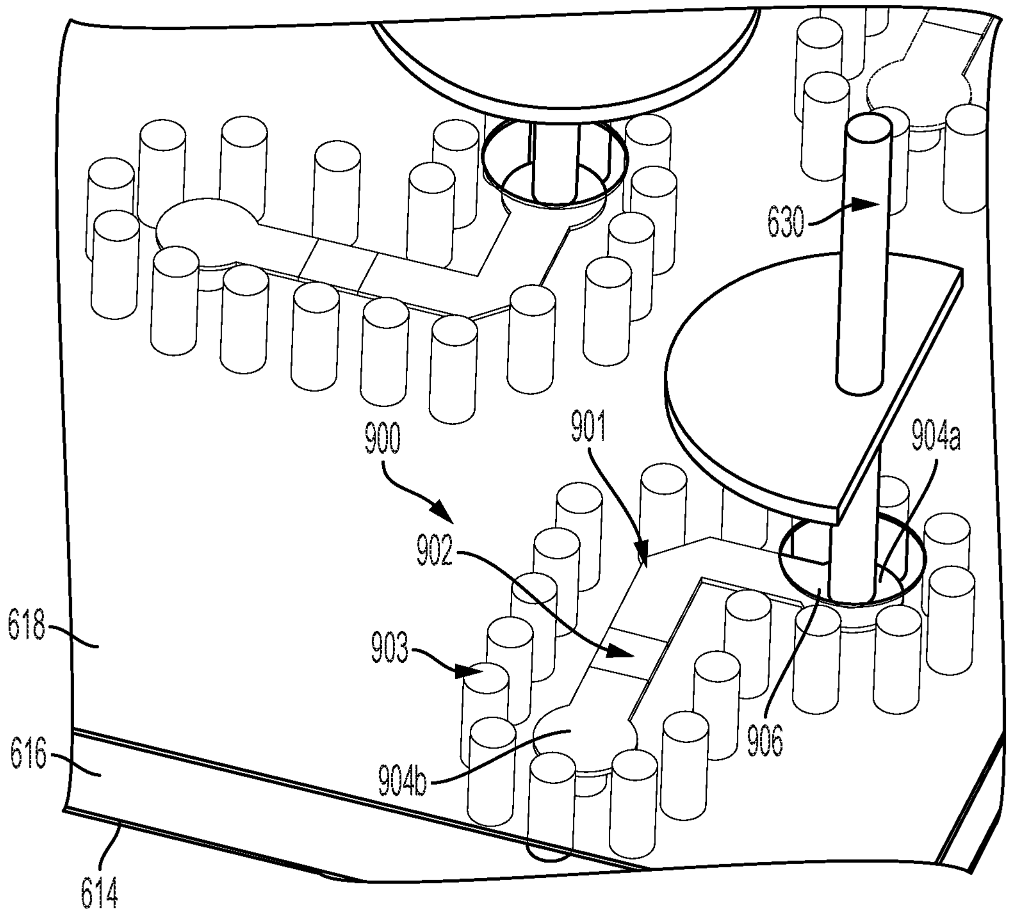
FIG. 7 is close up view of a top surface of an upper ground metal layer included in the PWB stripline termination network shown in FIG. 6A according to a non-limiting embodiment.

Turning to FIGS. 3, 4 and 5, a PBA 100 including an array 54 of broadband dual-polarized conductive elements is illustrated according to a non-limiting embodiment. The array 54 of broadband dual-polarized conductive elements are arranged as a plurality of broadband dual-polarized array cells 102 that include a termination coupled to a ground layer 105. In at least one embodiment, the PBA 100 can also implement a wide angle impedance matching (WAIM) superstrate 104 that covers the plurality of broadband dual-polarized array cells 102. The WAIM superstrate 104 can be formed from a variety of known WAIM dielectric materials and can include patterned metallization layers as well.

Turning now to FIG. 4, a cross-sectional view of a PBA 100 constructed using a printed wiring board (PWB) 600 is illustrated according to a non-limiting embodiment. The PWB 600 includes a ground layer 105, a plurality of dielectric layers 602, 604, 606, 608, 610, 612, and a plurality of metal layers 614, 616, 618, 620, 622, 624.

The ground layer 105 includes a lower metal layer 614 and an upper metal layer 618. In one or more embodiments, the lower metal layer 614 and upper metal layer 618 each serve as individual ground planes. An electrically conductive signal layer 616 is interposed between the lower metal layer 614 and upper metal layer 618. In one or more embodiments, the electrically conductive signal layer is formed as a metal stripline or metal microstrip.

The lower metal layer 614 is capable of being connected to a first ground reference point while the upper metal layer 618 is coupled to a second ground reference point. The upper and lower metal layers 618 and 614 therefore serve as individual ground planes having the same ground reference potential, while also isolating the metal stripline 616. Although not illustrated in FIG. 4, the PBA 100 can include a plurality of mode suppression vias that couple together metal layers 614 and 618. The mode suppression vias are configured to prevent cross-talk, particularly near signal vias such as dipole-to-stripline structures 630, for example, which carry a signal through the upper metal layer 618. The mode suppression vias also can prevent propagation of spurious signals generated near the signal via to stripline transition.

One or more stripline ground vias 626 conductively couple the metal stripline 616 to the lower metal layer 614. In this manner, the metal stripline 616 can be connected to the first ground reference, and can serve as a signal path from each dipole termination to a matched termination to ground. The metal stripline 616 can further include one or more resistive elements 628, which establish an impedance matching energy absorbing termination at the metal stripline 616. In one or more embodiments, the resistive element includes a resistor configured to absorb energy and mitigating co-site interference. The resistive elements 628 can be formed using a laminate film, and the resistance value of the resistive elements 628 establishes an impedance matching termination at the metal stripline 616. In at least one non-limiting embodiment, the resistance of a matched termination is equal to the characteristic impedance $Z_0$ of the transmission line being terminated, which in this case is stripline. Usually (but not always) $Z_0$=50 ohms. Since the PBA 600 is self-contained and does not require external interfaces (to instruments, amplifiers, etc.), the designer is free to either fix $Z_0$ at 50 ohms or vary $Z_0$ to optimize PBA performance. In either case, the resistance required to realize a matched termination is $Z_0$.

The lower intermediate dielectric layer 606 is formed on an upper surface of the upper metal ground layer 618. The upper intermediate dielectric layer 608 is formed on an upper surface of the lower intermediate dielectric layer 606, such that a dielectric interface 620 is formed therebetween. Each of the lower and upper intermediate dielectric layers 606 and 608 can be formed from various dielectric materials including, but not limited to, porcelain, mica, glass, plastics, copper-clad laminates, and some metal oxides.

The PBA 100 further includes a plurality of dipole-to-stripline structures 630 and a plurality of electrically conductive dipole-to-ground via structures 632. The upper ends of the dipole-to-stripline structures 630 and the plurality of electrically conductive dipole-to-ground via structures 632 are conductively coupled to metal layer 624 so as to construct a dipole element. Metal layer 622 can be disposed beneath the metal dipole layer 624 to tune the frequency response with increasing or decreasing dipole-to-dipole coupling capacitance.

The opposing lower ends of the dipole-to-stripline structures 630 are passed through the upper ground metal layer 618 and are conductively coupled to the metal stripline 616. The opposing lower ends of the dipole-to-ground via structures 632 are conductively coupled to the upper metal ground layer 618. The dipole-to-stripline structures 630 include signal capacitor elements 634, which can electrically couple the dipole-to-stripline structures 630 to the dipole-to-ground structures 632 and improves bandwidth. Similarly, the dipole-to-ground structures 632 include a ground capacitor elements 636, which can be charged by energy provided by a neighboring signal capacitor element 634.

Referring to FIG. 5, an array cell 102 is illustrated according to a non-limiting embodiment. Each array cell 102 is arranged as two pairs of orthogonally polarized conductive elements (see FIG. 5). For example, conductive elements 106*a* define a first pair of polarized conductive elements, while conductive elements 106*b* define a second pair of polarized conductive elements.

Figure 8:
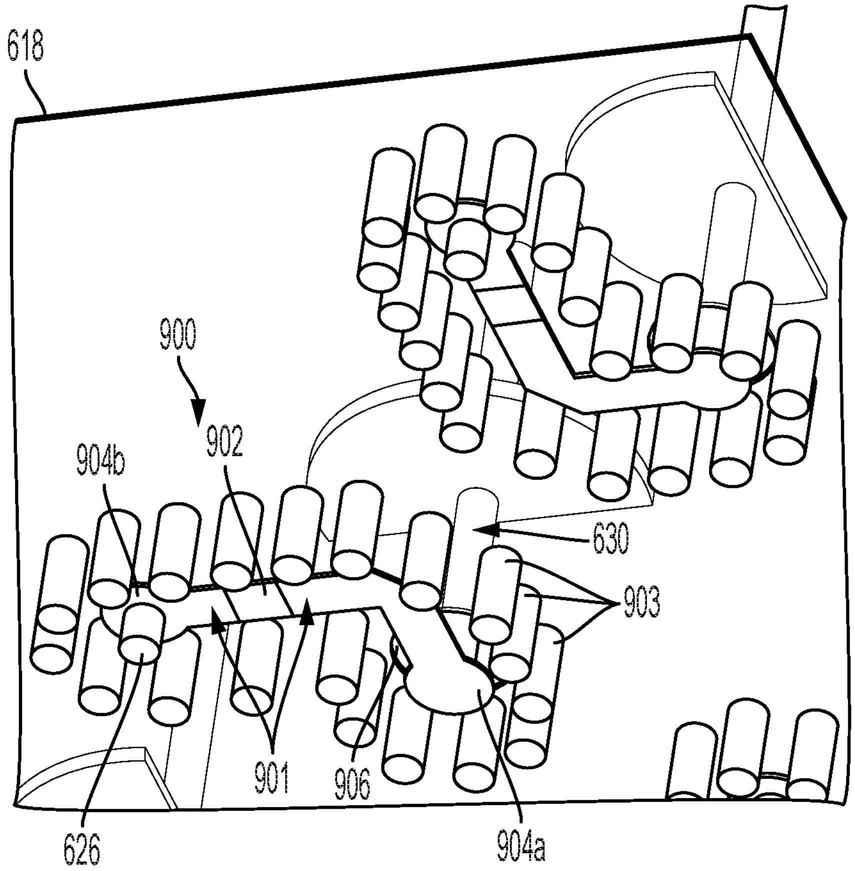
FIG. 8 is close up view of a bottom surface of the upper ground metal layer included in the PWB stripline termination network shown in FIG. 6A according to a non-limiting embodiment.

Turning now to FIGS. 6A, 6B, 7 and 8, a PWB stripline termination network included in a printed broadband absorber 600 is illustrated according to a non-limiting embodiment. The stripline network includes a plurality of stripline elements 900. Each stripline element 900 includes an electrically isolated stripline 901 surrounded by a plurality of mode suppression vias 903. The striplines 901 are coupled to a ground plane. Each stripline 901 includes a terminating resistor 902 interposed between opposing via pads 904*a* and 904*b*. A signal via through-hole 906 exposes via pad 904*a*, which provides physical access to a signal via of a respective dipole-to-stripline structure 630 (not shown in FIG. 6A). For example, a lower end (i.e., terminating end) of a dipole-to-stripline structure 630 extends through signal via through-hole 906, and contacts via pad 904*a* (see FIG. 7). The bottom surface of the upper metal layer 618 is depicted in FIG. 8, and shows one end of a ground via 626 contacting the opposing contacts via pad 904*b*. The opposing end of the contacts via pad 904*a* is configured to contact the lower metal ground layer 614 (not shown in FIG. 8).

As described herein, a printed broadband absorber (PBA) is provided, which includes a periodic array of broadband dual-polarized conductive elements that are match-terminated to a ground potential so as to absorb energy received by each element. The PBA can be integrated with multiple apertures to mitigate co-site interference between transmit and receive arrays located within close proximity to one another. The PBA also provides wideband attenuation to facilitate simultaneous operation by neighboring multi-function RF systems (e.g., transceivers) having shared or overlapping bands. The integration of radiating and match-terminated absorbing elements provides a seamless transition between aperture and absorber, which limits scattering and lowers installation costs.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A radio frequency (RF) system comprising:

at least one transmitter including a transmitter (TX) antenna array and a TX signal absorber, the TX antenna array configured to output a first RF signal; and at least one receiver including a receiver (RX) antenna array and a RX signal absorber, the RX antenna array configured to receive a second RF signal, wherein the TX signal absorber and the RX signal absorber are each configured to absorb energy induced by the first RF signal thereby mitigating electrical co-site interference between the transmitter and the receiver, wherein the TX antenna array includes a transmitting-array of broadband dual polarized elements configured to output the first RF signal, and wherein the RX antenna array includes a receiving-array of broadband dual polarized elements configured to receive the second RF signal.

2. The RF system of claim 1, wherein the RF system includes a first transceiver that includes the at least one transmitter and a second transceiver that includes the at least one receiver, the first and second transceivers separately located from one another by a distance.

3. The RF system of claim 1, wherein each of the TX signal absorber and the RX signal absorber is constructed as a printed broadband absorber (PBA).

4. The RF system of claim 3, wherein the PBA further comprises an array of broadband dual-polarized conductive elements configured to absorb energy induced by the first RF signal thereby mitigating electrical interference between the at least one transmitter and the at least one receiver.

5. The RF system of claim 4, wherein the PBA included with the at least one transmitter is co-planar with the TX antenna array, and the PBA included with the at least one receiver is co-planar with the RX antenna array.

6. The RF system of claim 5, wherein the PBA included with the at least one transmitter completely surrounds the TX antenna array, and the PBA included with the at least one receiver completely surrounds the RX antenna array.

7. A printed broadband absorber (PBA) comprising:

a plurality of broadband dual-polarized array cells, each array cell including a plurality of conductive elements;

a ground plane in signal communication with the plurality of broadband dual-polarized array cells, the ground plane electrically coupled to a ground potential; and an electrically conductive signal layer configured to establish a matched terminated impedance of the plurality of broadband dual-polarized array cells that mitigates co-site electrical interference between a transmitter and a receiver.

8. The PBA of claim 7, wherein each array cell is arranged as two pairs of orthogonally polarized conductive elements.

9. The PBA of claim 8 wherein each conductive element is a dipole antenna having a receiving element and a dipole via, the dipole via electrically coupling the receiving element to the electrically conductive signal layer that interfaces with the ground potential via a matched termination.

10. The PBA of claim 9, further comprising a wide angle impedance matching (WAIM) superstrate on the plurality of broadband dual-polarized array cell.

11. A method of reducing co-site electrical interference, the method comprising:

surrounding a transmitter (TX) antenna array included in a transmitter with a TX signal absorber;

surrounding a receiver (RX) antenna array included in a receiver with a RX signal absorber, the RX antenna array configured to receive a first RF signal;

receiving the first RF signal by an array of receiving broadband dual polarized conductive elements defining the RX antenna array; and outputting a second RF signal via the TX antenna array, the outputting including outputting the second RF signal from an array of transmitting broadband dual polarized conductive elements defining the TX antenna array, wherein the TX signal absorber and the RX signal absorber are each configured to absorb energy induced by the second RF signal thereby reducing the co-site electrical interference between the transmitter and the receiver.

12. The method of claim 11, further comprising attenuating transmission of electromagnetic radiation from the TX antenna array to the RX antenna array using a radio-absorbing material (RAM) isolation barrier interposed between the transmitter and the receiver.

13. The method of claim 11, wherein each of the TX signal absorber and the RX signal absorber is constructed as a printed broadband absorber (PBA).

14. The method of claim 13, further comprising absorbing, via an array of broadband dual-polarized conductive elements included in the PBA, energy induced by the second RF signal to mitigate electrical interference between the transmitter and the receiver.

15. The method of claim 14, further comprising arranging the PBA included with the transmitter to be co-planar with the TX antenna array, and arranging the PBA included with the receiver to be co-planar with the RX antenna array.

16. The method of claim 15 further comprising completely surrounding the TX antenna array with the PBA included with the transmitter, and completely surrounding the RX antenna array with the PBA included with the receiver.

17. The method of claim 14, further comprising electrically coupling the second array of broadband dual-polarized conductive elements to a ground potential so as to provide a matched terminated impedance of the plurality of broadband dual-polarized array cells.

* * * * *